US012346093B2

(12) United States Patent
Korol et al.

(10) Patent No.: US 12,346,093 B2
(45) Date of Patent: Jul. 1, 2025

(54) MOTOR CONTROLLER HAVING BEMF COMPENSATION FOR NOISE AND/OR VIBRATION REDUCTION

(71) Applicant: Allegro MicroSystems, LLC, Manchester, NH (US)

(72) Inventors: Serhii Korol, Kyiv (UA); Anton Babushkin, Kyiv (UA); Vadym Khudobets, Kyiv (UA); Oleksii Dudnyk, Poltava (UA)

(73) Assignee: Allegro MicroSystems, LLC, Manchester, NH (US)

( * ) Notice: Subject to any disclaimer, the term of this patent is extended or adjusted under 35 U.S.C. 154(b) by 608 days.

(21) Appl. No.: 17/807,203

(22) Filed: Jun. 16, 2022

(65) Prior Publication Data
US 2023/0409006 A1   Dec. 21, 2023

(51) Int. Cl.
  *G05B 19/4155*  (2006.01)
  *H02P 23/14*  (2006.01)

(52) U.S. Cl.
  CPC .......... *G05B 19/4155* (2013.01); *H02P 23/14* (2013.01); *G05B 2219/41321* (2013.01)

(58) Field of Classification Search
  CPC ...... G05B 19/4155; G05B 2219/41321; H02P 23/14; H02P 29/50; H02P 6/182; H02P 21/05; H02P 23/0004; H02P 23/04; H02P 25/022; H02P 27/08; H02P 2207/05
  USPC .................. 318/400.34, 400.32, 400.01, 700
  See application file for complete search history.

(56) References Cited

U.S. PATENT DOCUMENTS

| | | | |
|---|---|---|---|
| 7,405,532 B2 * | 7/2008 | Chang | H02P 8/22 318/696 |
| 8,030,876 B2 * | 10/2011 | Chang | H02P 8/12 318/696 |
| 8,988,033 B2 * | 3/2015 | Shibata | G01B 21/04 318/617 |
| 9,843,285 B1 | 12/2017 | Lu | |
| 9,887,653 B2 | 2/2018 | Ross et al. | |
| 10,116,243 B2 | 10/2018 | Lu et al. | |
| 10,181,810 B2 | 1/2019 | Lu et al. | |
| 10,312,847 B2 | 6/2019 | Lu | |
| 10,326,389 B2 | 6/2019 | Lu et al. | |
| 10,348,223 B1 | 7/2019 | Khosravi et al. | |
| 10,784,810 B1 | 9/2020 | Lu | |
| 10,873,280 B2 | 12/2020 | Lu et al. | |
| 10,924,052 B1 | 2/2021 | Khosravi et al. | |

(Continued)

OTHER PUBLICATIONS

U.S. Appl. No. 11/387,756, filed Jul. 12, 2022, Khosravi et al.
(Continued)

*Primary Examiner* — David Luo
(74) *Attorney, Agent, or Firm* — DALY, CROWLEY, MOFFORD & DURKEE, LLP

(57) ABSTRACT

Methods and apparatus for compensating for non-sinusoidal BEMF signals in an electrical motor using amplitudes, phases and orders of BEMF harmonic components and amplitude of 1st harmonic of BEMF of the electrical motor. First and second corrective components for vd and vq of the d-q coordinate system for the motor can be generated from amplitudes of the BEMF harmonic components and the angles of the BEMF harmonic components orders of the BEMF harmonic components and amplitude of 1st harmonic of BEMF.

19 Claims, 10 Drawing Sheets

(56) References Cited

U.S. PATENT DOCUMENTS

2021/0218317 A1    7/2021    Metivier et al.

OTHER PUBLICATIONS

Allegro MicroSystems, "Three-Phase Sensorless Fan Driver;" Datasheet A89331; May 20, 2020; 2 Pages.

Castro et al., "Novel MTPA Approach for IPMSM with Non-Sinusoidal Back-EMF;" Proceedings of the IEEE 15th Brazilian Power Electronics Conference and $5^{th}$ IEEE Southern Power Electronics Conference (COBEP/SPEC); Dec. 1, 2019; 6 Pages.

Kim et al., "A Novel Current Control Strategy Based on Harmonic Voltage Injection for Power Losses Reduction of PMSMs with Non-Sinusoidal Back-EMF;" IEEE Industry Applications Society Annual Meeting; Sep. 29, 2019; 6 Pages.

Liu et al., "Simplified Predictive Torque Control of Five Phase Permanent Magnet Motor with Non Sinusoidal Back EMF;" $44^{th}$ Annual Conference of the IEEE Industrial Electronics Society (IECON 2018); Oct. 21, 2018; 5 Pages.

\* cited by examiner

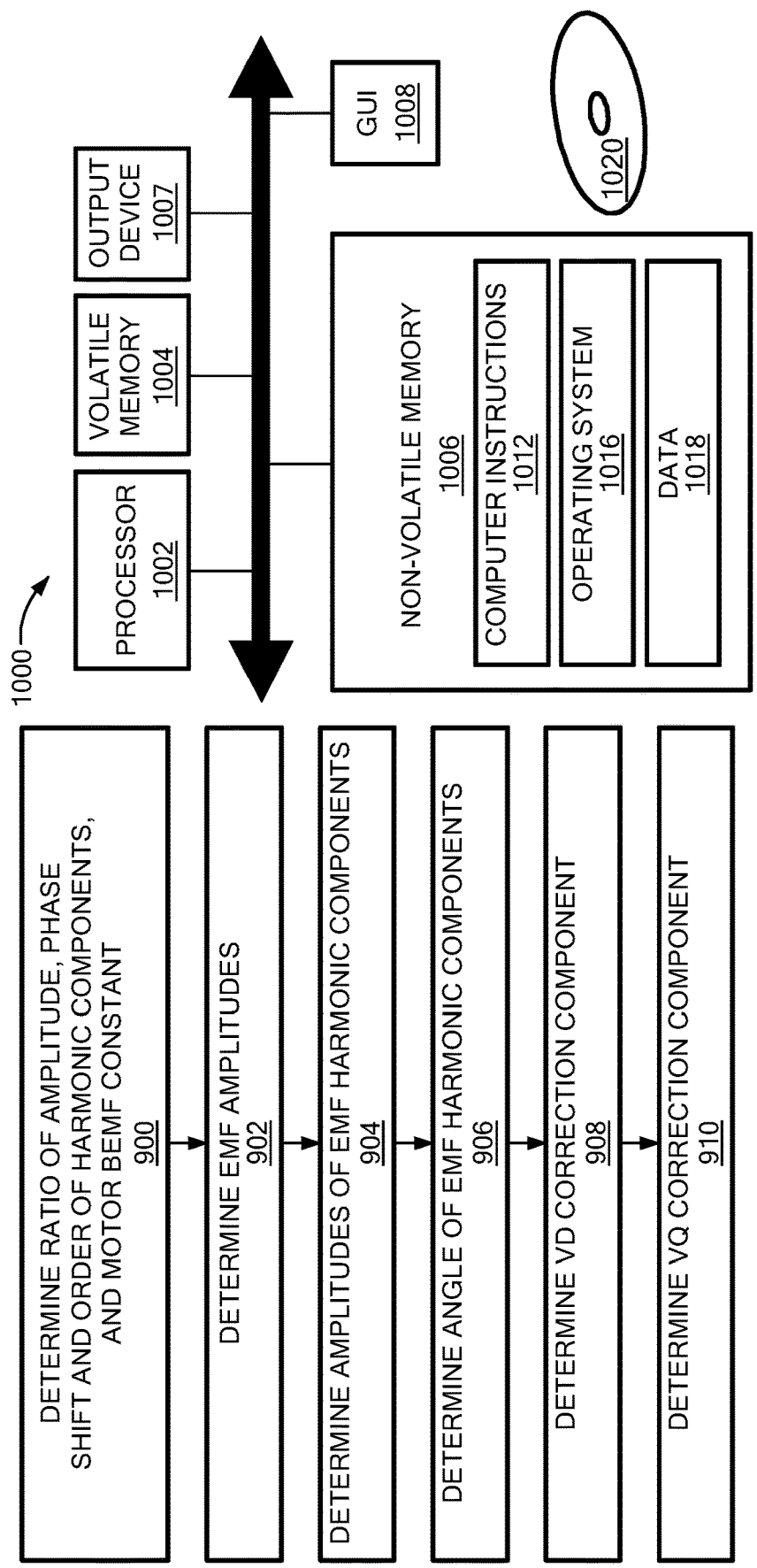

MOTOR CONTROLLER HAVING BEMF COMPENSATION FOR NOISE AND/OR VIBRATION REDUCTION

BACKGROUND

As is known in the art, motor controller integrated circuits can be used to control and drive brushless DC (BLDC) electric motors. Conventional control systems for permanent magnet synchronous machines (PMSM) typically supply a sinusoidal voltage to the motor that changes only in frequency, phase and amplitude. However, a non-sinusoidal back EMF (BEMF) leads to distortions in the shape of PMSM phase currents that can degrade motor performance.

SUMMARY

Embodiments of the disclosure provide methods and apparatus for compensation of BEMF non-sinusoidality by adjusting voltage in a d-q coordinate system in order to provide direct compensation for influence of the non-sinusoidal BEMF by modifying the voltage shape. In embodiments, compensation components for compensating for higher harmonics can be generated. In some embodiments, there is direct control of the phase shift in the compensation components. In embodiments, accurate harmonics compensation is achieved using only a motor Back EMF constant Ke. An angle between the voltage and the BEMF of the motor may be accounted for by default to achieve accurate compensation of non-sinusoidal BEMF in dynamic and/or static conditions. In embodiments, compensation is performed independently of the load, rotation speed and motor inductance. In some embodiments, the system performs direct compensation of phase shift that allows compensation for control system delay, speed estimation error, and/or other unwanted effects.

In one aspect, a method comprises: compensating for non-sinusoidal BEMF signals in an electrical motor by: receiving ratio of amplitude, phase shift and order of BEMF harmonic components of the electrical motor; receiving BEMF constant of the electrical motor; determining the actual amplitude of BEMF and actual amplitudes of the BEMF harmonic components; determining angles of the BEMF harmonic components from an order of the BEMF harmonic components, an angle from a d-q coordinate system for the motor, and phase shifts of the BEMF harmonic components relative to a fundamental first harmonic; generating a first corrective component for vd of the d-q coordinate system for the motor from the amplitudes of the BEMF harmonic components and the angles of the BEMF harmonic components; and generating a second corrective component for vq of the d-q coordinate system for the motor from the amplitudes of the BEMF harmonic components and the angles of the BEMF harmonic components.

A method can further include one or more of the following features: generating the first corrective component from a cosine of the angles of the BEMF harmonic components, generating the second corrective component from a sine of the angles of the BEMF harmonic components, determining angles of the BEMF harmonic components further includes a phase shift correction factor for the BEMF harmonic components, the phase shift correction factor includes compensation for delay in the system, the phase shift correction factor includes compensation for speed estimation error, and/or the phase shift correction factor includes compensation for unwanted effects.

In another aspect, a system comprises: a compensation system having a processor and memory configured to: compensate for non-sinusoidal BEMF signals in an electrical motor by: receiving ratio of amplitude, phase shift and order of BEMF harmonic components of the electrical motor; receiving BEMF constant of the electrical motor; determining the actual amplitude of BEMF and actual amplitudes of the BEMF harmonic components; determining angles of the BEMF harmonic components from an order of the BEMF harmonic components, an angle from a d-q coordinate system for the motor, and phase shifts of the BEMF harmonic components relative to a fundamental first harmonic; generating a first corrective component for vd of the d-q coordinate system for the motor from the amplitudes of the BEMF harmonic components and the angles of the BEMF harmonic components; and generating a second corrective component for vq of the d-q coordinate system for the motor from the amplitudes of the BEMF harmonic components and the angles of the BEMF harmonic components.

A system can further include one or more of the following features: the processor and memory are further configured for generating the first corrective component from a cosine of the angles of the BEMF harmonic components, the processor and memory are further configured for generating the second corrective component from a sine of the angles of the BEMF harmonic components, determining angles of the BEMF harmonic components further includes a phase shift correction factor for the BEMF harmonic components, the phase shift correction factor includes compensation for delay in the system, the phase shift correction factor includes compensation for speed estimation error, and/or the phase shift correction factor includes compensation for unwanted effects.

In a further aspect, a system comprises: an interface configured to connect to an electrical motor: and a means for compensating for non-sinusoidal BEMF signals in the electrical motor. A system can further includes the means for compensating for non-sinusoidal BEMF signals in the electrical motor is configured for generating a first corrective component for vd of a d-q coordinate system for the motor from amplitudes of BEMF harmonic components and angles of the BEMF harmonic components, and for generating a second corrective component for vq of the d-q coordinate system for the motor from the amplitudes of the BEMF harmonic components and the angles of the BEMF harmonic components, the means for compensating for non-sinusoidal BEMF on signals in the electrical motor is further configured for generating the first corrective component from a cosine of the angles of the BEMF harmonic components and generating the second corrective component from a sine of the angles of the BEMF harmonic components, determining angles of the BEMF harmonic components further includes a phase shift correction factor for the BEMF harmonic components, the phase shift correction factor includes compensation for delay in the system, and/or the phase shift correction factor includes compensation for speed estimation error.

BRIEF DESCRIPTION OF THE DRAWINGS

The foregoing features of this invention, as well as the invention itself, may be more fully understood from the following description of the drawings in which:

FIG. 9 shows an example sequence of steps for providing BEMF compensation in accordance with example embodiments of the disclosure; and FIG. 10 is a schematic representation of an example computer that can perform at least a portion of the processing described herein.

DETAILED DESCRIPTION

Figure 1:
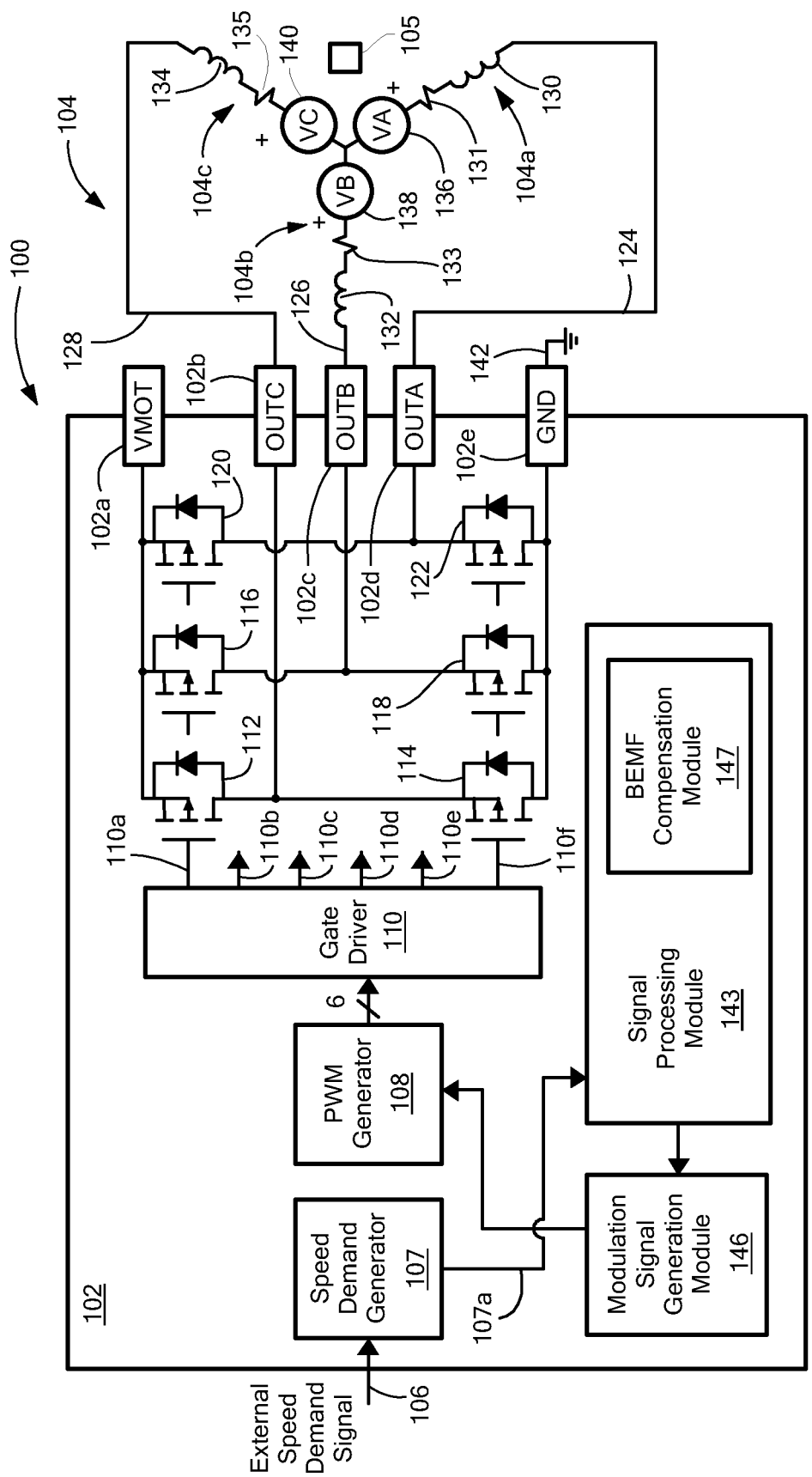
FIG. 1 shows an example motor control circuit coupled to an electric motor for providing BEMF compensation in accordance with example embodiments of the disclosure.

FIG. 1 shows an example motor control circuit 102 coupled to an electric motor 104 for providing BEMF compensation in accordance with example embodiments of the disclosure. In embodiments, a magnetic sensing element 105, which can comprise a Hall element, can collect information for non-sinusoidal BEMF compensation to enhance operational efficiency and acoustic performance of the overall system.

Example embodiments of the disclosure provide methods and apparatus for compensating for the influence of a BEMF with a known shape. It is understood that any suitable technique, component, sensor, sensorless, etc., can be used for detecting BEMF shape. While example embodiments are described in conjunction with a system having a Hall element for BEMF detection, it is understood that this should not be construed to limit the scope of the invention as claimed in any way.

It should be noted that the term sensorless control, without specifying the type of absence sensor, implies the absence of a speed sensor. Example compensator embodiments can be used in systems with and without a speed sensor, or in other words: speed control systems and sensorless speed control systems.

It is further understood that example embodiments of the disclosure utilize information about phase currents in PMSM speed control systems and information about the shape of the bemph (amplitude, phase and harmonic number), which can be obtained in any suitable way.

The motor 104 is shown to include three windings 104a, 104b, 104c, which can be depicted as a respective equivalent circuit having an inductor in series with a resistor and in series with a back EMF (BEMF) voltage source. For example, the winding A 104a is shown to include an inductor 130 in series with a resistor 131 and in series with a back EMF voltage source VA 136.

The motor control circuit 102 includes a speed demand generator 107 coupled to receive an external speed demand signal 106 from outside of the motor control circuit 102. The external speed demand signal 106 can be in one of a variety of formats. In general, the external speed demand signal 106 is indicative of a speed of the motor 104 that is requested from outside of the motor control circuit 102.

The speed demand generator 107 is configured to generate a speed demand signal 107a, which can be sent to a signal processing module 143. A pulse width modulation (PWM) generator 108 is configured to generate PWM signals having a duty cycle and pattern that is controlled by a modulation signal generation module 146. The PWM signals are generated with a modulation characteristic (i.e., a relative time-varying duty cycle) in accordance with the modulation waveforms. In example embodiments, information is transmitted from the 107, to a signal processing module 143, to a modulation signal generation module 146, to the PWM generator 108.

The motor control circuit 102 also includes a gate driver circuit 110 coupled to receive the PWM signals and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 operate in saturation to provide three motor drive signals VoutA, VoutB, Outs, 124, 126, 128, respectively, at nodes 102d, 102c, 102b, respectively. It is understood that any suitable configuration of switching elements can be used to provide the motor drive signals.

The motor control circuit 102 can also include a signal processing module 143 and bEMF compensation module 147 the operation of which is described more fully below.

The signal processing module 143 is configured to generate a position reference signal indicative of a rotational reference position of the motor 104. The modulation signal generation module 146 is coupled to receive the position reference signal and configured to change a phase of the modulation waveforms provided to the PWM generator 108.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

Figure 2:
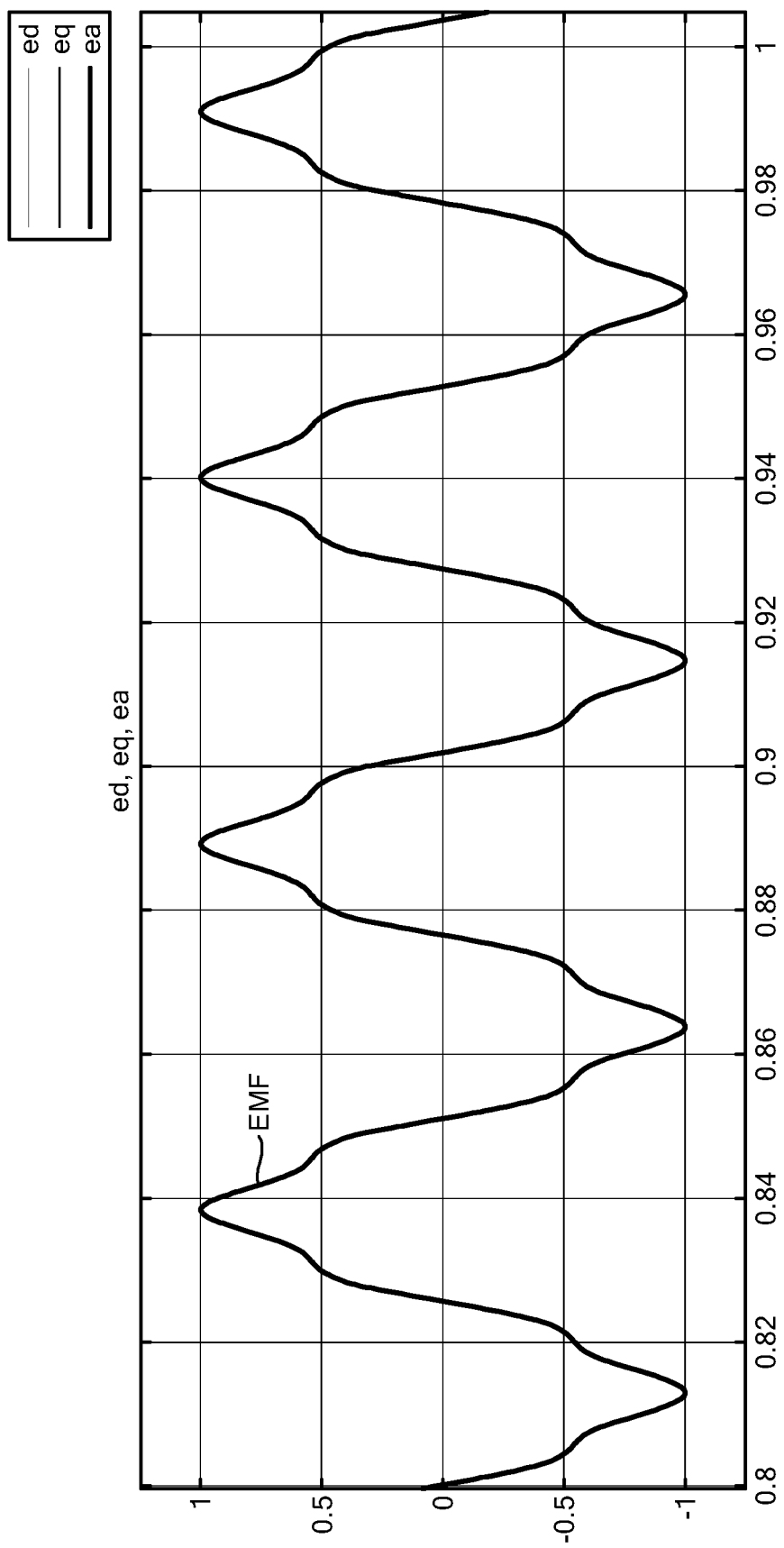
FIG. 2 shows one phase of an example a non-sinusoidal BEMF for a typical PMSM.

Control systems for permanent magnet synchronous machines (PMSM) typically attempt to supply a sinusoidal voltage to the motor that changes only in frequency, phase and amplitude. FIG. 2 shows one phase of an example a non-sinusoidal BEMF for a typical PMSM. It will be appreciated that a non-sinusoidal BEMF leads to distortions in the shape of PMSM phase currents.

At a relatively low PMSM speeds, sufficiently fast current regulators can bring the shape of the currents closer to the desired sinusoidal shape. But since the speed of the current regulators is limited, the shape of the currents moves away from the sinusoidal with an increase in the frequency of the PMC current.

Figure 3:
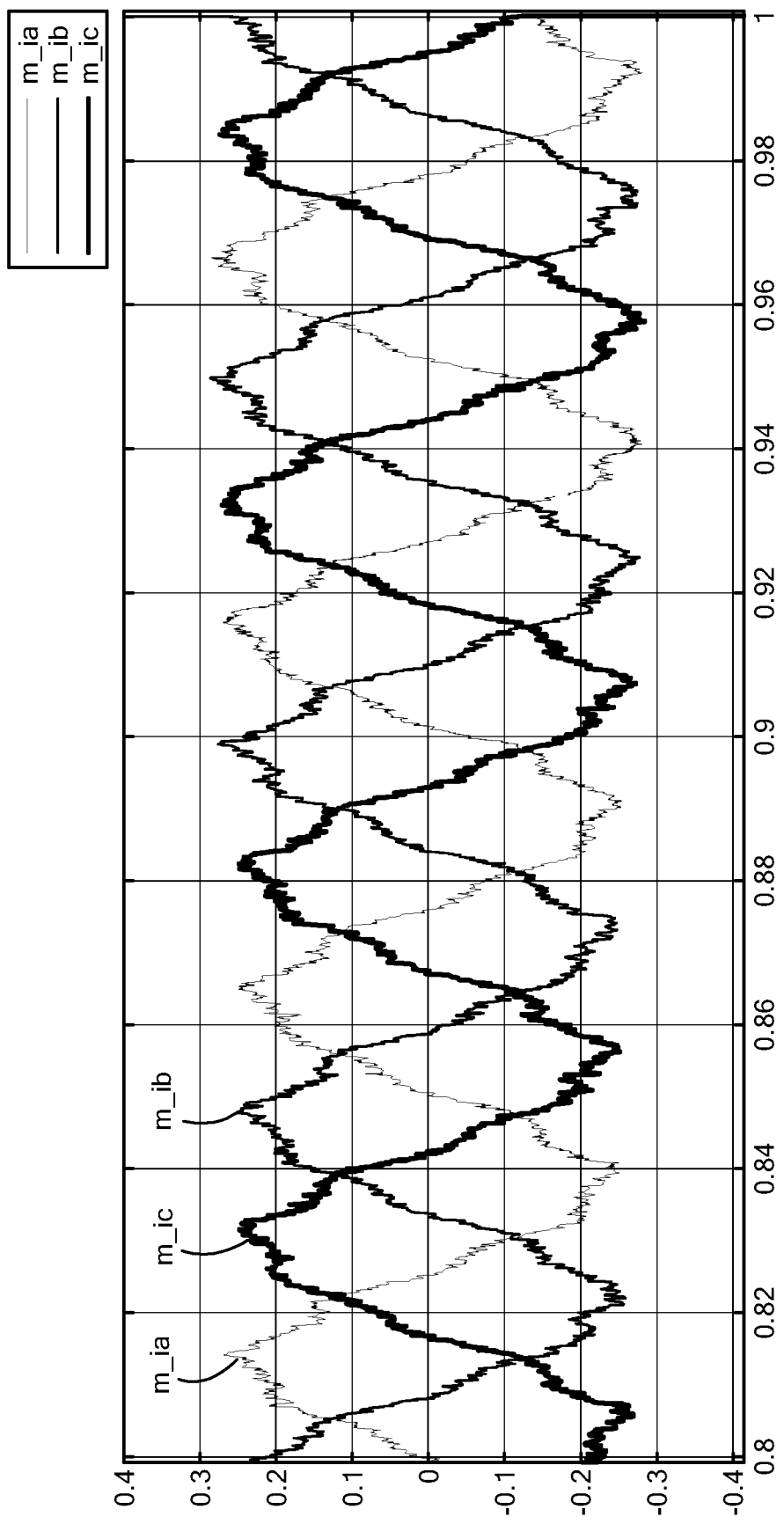
FIG. 3 shows example PMSM currents without correction of the BEMF non-sinusoidality for an electrical frequency 20 Hz.

FIG. 3 shows example PMSM currents without correction of the BEMF non-sinusoidality for an electrical frequency 20 Hz. As can be seen, the non-sinusoidal BEMF results in distorted PMSM currents which may degrade motor performance.

Figure 4:
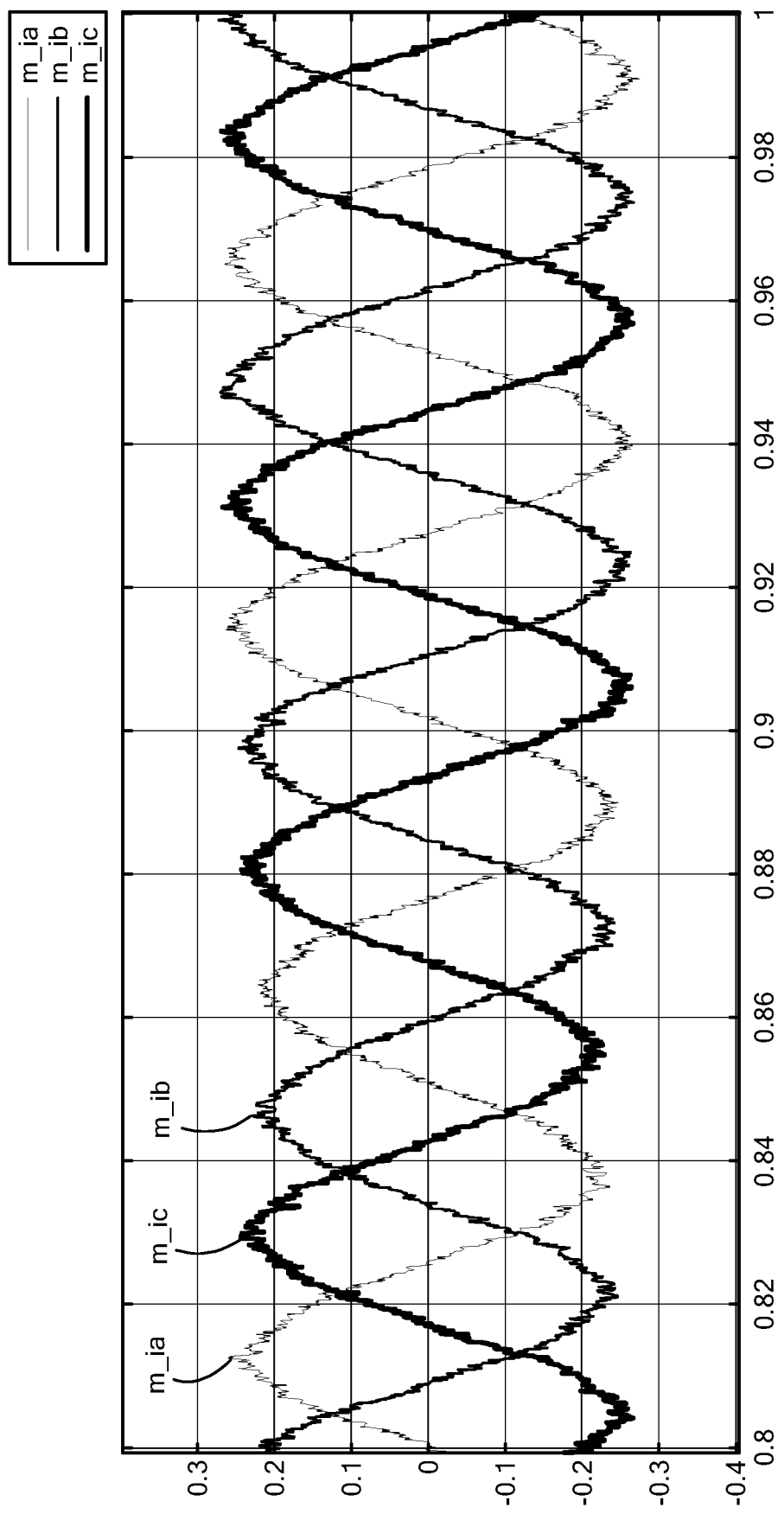
FIG. 4 shows example PMSM currents with correction of the BEMF non-sinusoidality in accordance with example embodiments of the disclosure.

FIG. 4 shows example PMSM currents with correction of the BEMF non-sinusoidality in accordance with example embodiments of the disclosure. The illustrated phase A, B, C currents m_ia, m_ib, m_ic have an electrical frequency of 20 Hz.

Figure 5:
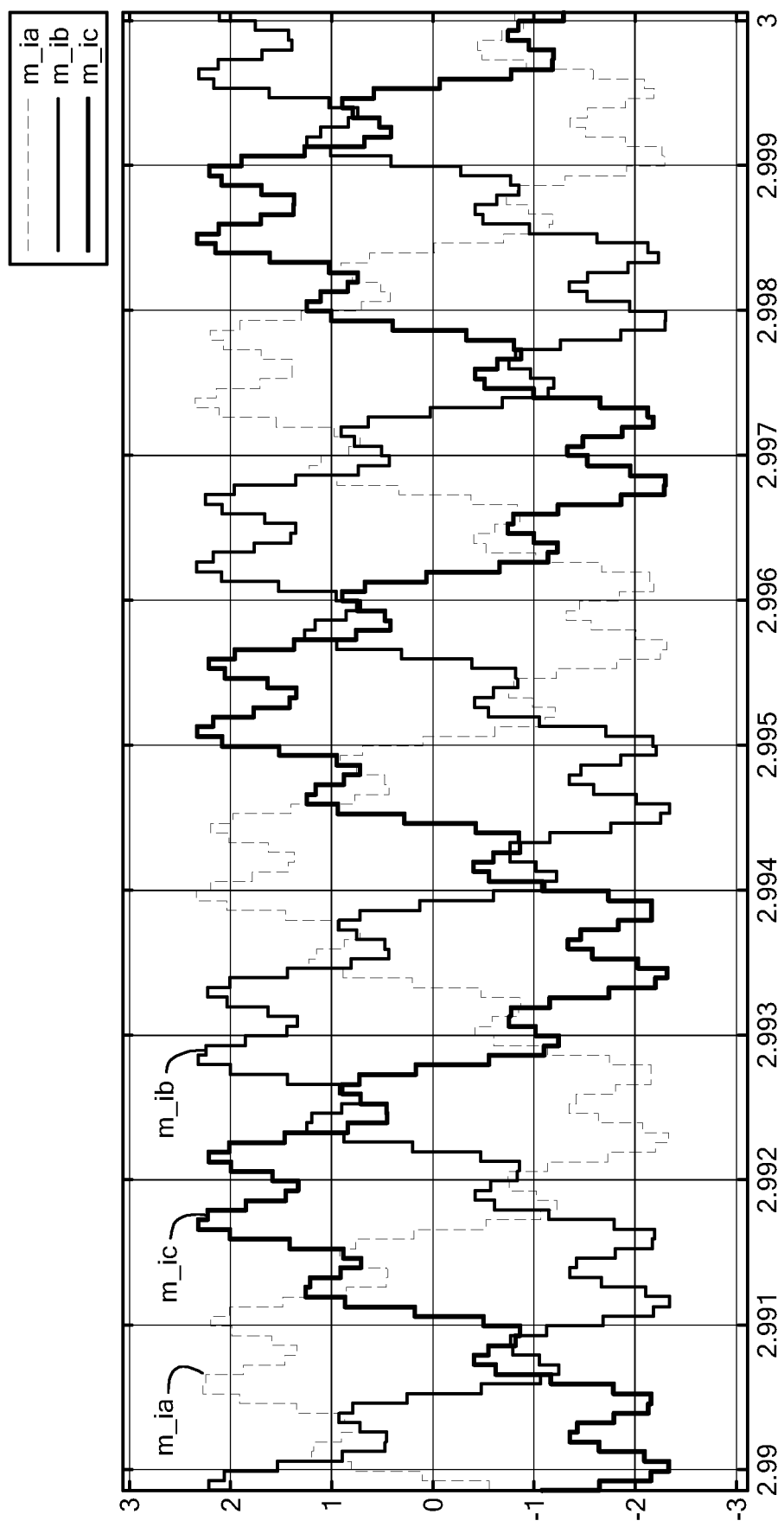
FIG. 5 shows example PMSM currents without correction of the BEMF non-sinusoidality for an electrical frequency 300 Hz.

FIG. 5 shows example PMSM currents without correction of the BEMF non-sinusoidality for an electrical frequency 300 Hz. As can be seen, amount of distortion in the PMSM currents increases as frequency increases. The distortion in the PMSM currents shown in FIG. 5 is significantly greater than those shown in FIG. 3.

Figure 6:
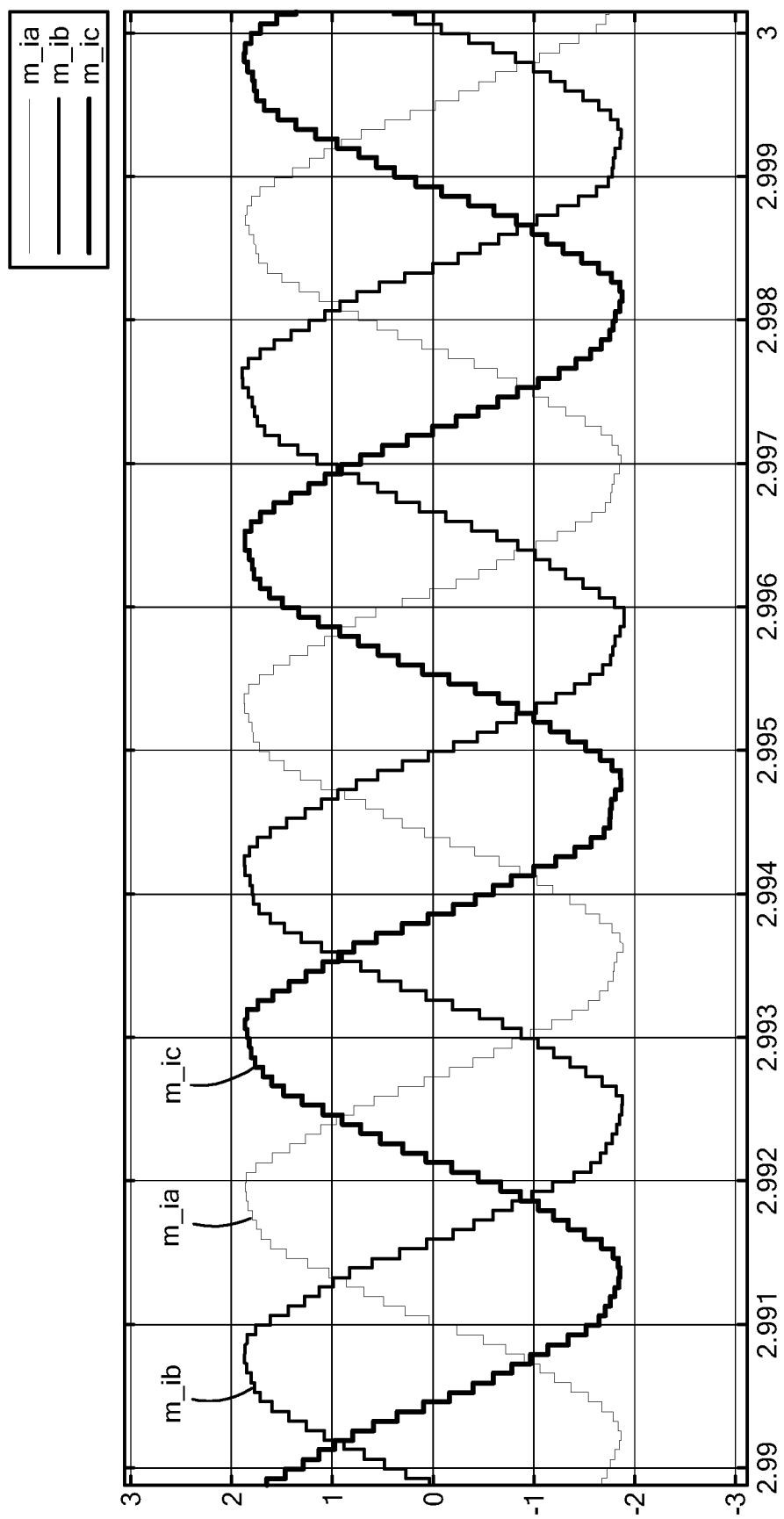
FIG. 6 shows example PMSM currents with correction of the BEMF non-sinusoidality in accordance with example embodiments of the disclosure.

FIG. 6 shows PMSM currents with correction of the BEMF non-sinusoidality for an electrical frequency 300 Hz. As can be seen the PMSM currents of FIG. 6 for 300 Hz are comparable to the PMSM currents of FIG. 4 for 20 Hz with regard to distortion. Even as frequency increases, BEMF compensation provides substantially sinusoidal PMSM currents.

Figure 7:
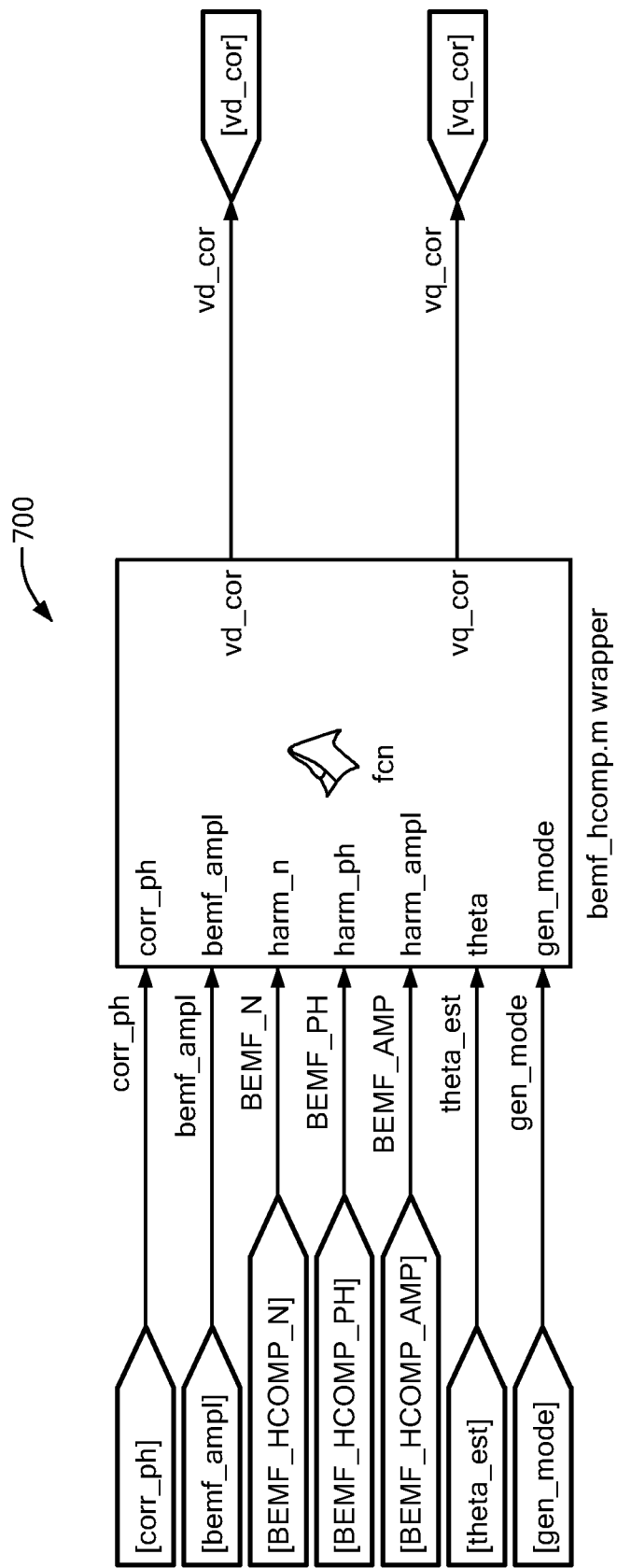
FIG. 7 shows an example an BEMF compensation module 700 that uses the values of the frequency and amplitude of the harmonics present in the BEMF.
Figure 7A:
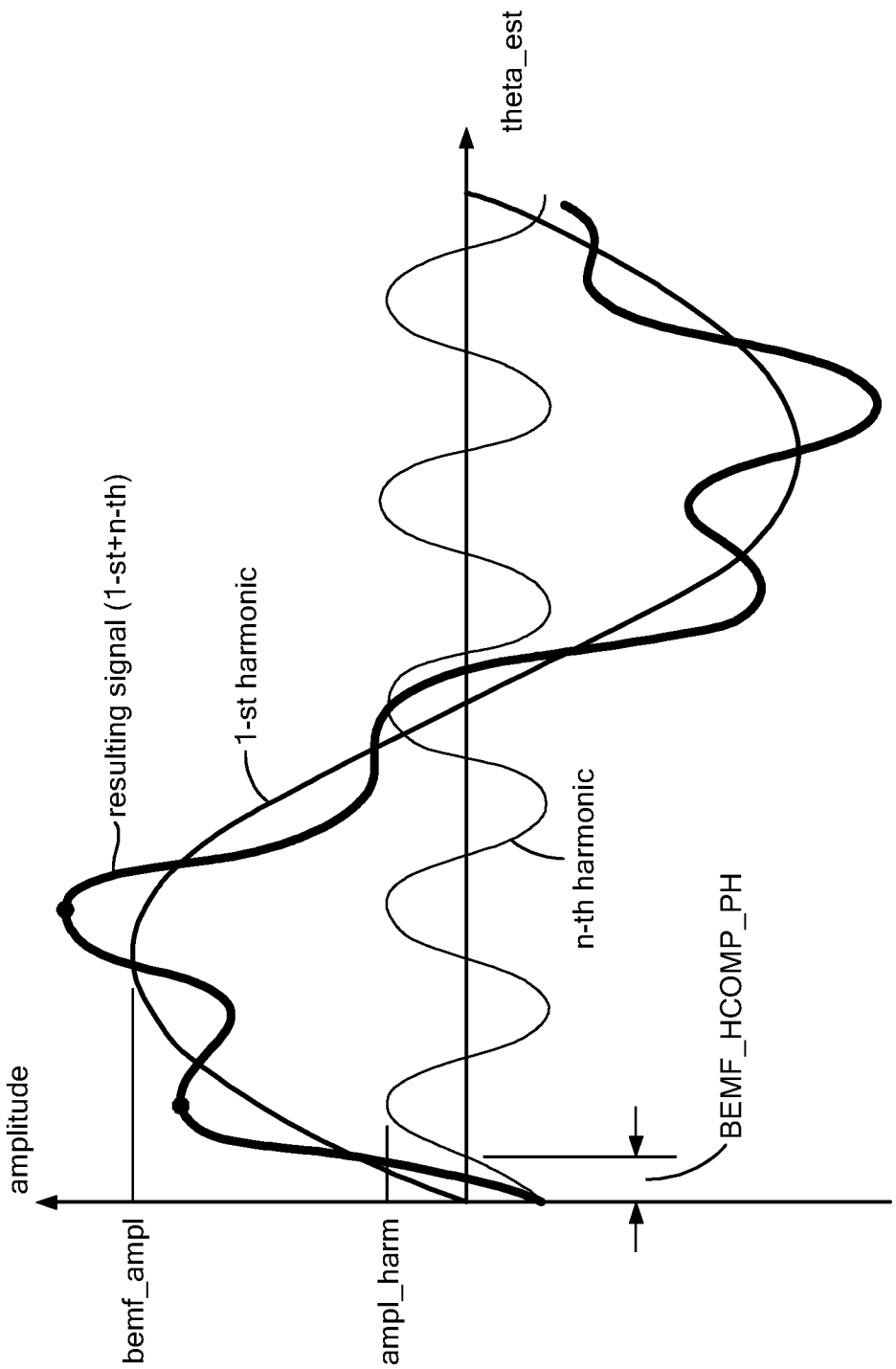
FIG. 7A is a waveform diagram showing example signals for the system of FIG. 7.

In an aspect of the disclosure, a system uses forward compensation for a non-sinusoidal BEMF. FIG. 7 shows an example an BEMF compensation module 700 that uses the values of the frequency and amplitude of the harmonics present in the BEMF and FIG. 7A is a waveform diagram showing example signal relationships for the signals described below. In example embodiments, compensating components are calculated in accordance with the expression:

ampl_harm=−bemf_ampl*BEMF_HCOMP_AMP theta_*n*=(BEMF_HCOMP_*N*+1)*theta_est+BEMF_HCOMP_PH+corr_ph vd_cor=ampl_harm*cos(theta_*n*)

vq_cor=ampl_harm*sin(theta_*n*)

where:
ampl_harm—actual amplitudes of BEMF harmonic components (depends on amplitude of EMF);
bemf_ampl bemf_ampl—actual amplitude of BEMF;
BEMF_HCOMP_AMP—ratio of harmonic components amplitudes to BEMF amplitude;
theta_n theta_n—actual angles of harmonic components;
BEMF_HCOMP_N—oder of harmonic components;
theta_esttheta—actual angle of d-q coordinate system;
BEMF_HCOMP_PH BEMF_HCOMP_PH—phase shifts of the BEMF harmonic components relative to the fundamental first harmonic;
Corr_phcorr_phphase_advance—additional correction of phase shift of harmonic components for compensation control system's delay, speed estimation error and other unwanted effects;
vd_corv_d_cor—corrective component that is added to the voltage vd; and
vq_corv_q_cor—corrective component that is added to the voltage vq.

Figure 8:
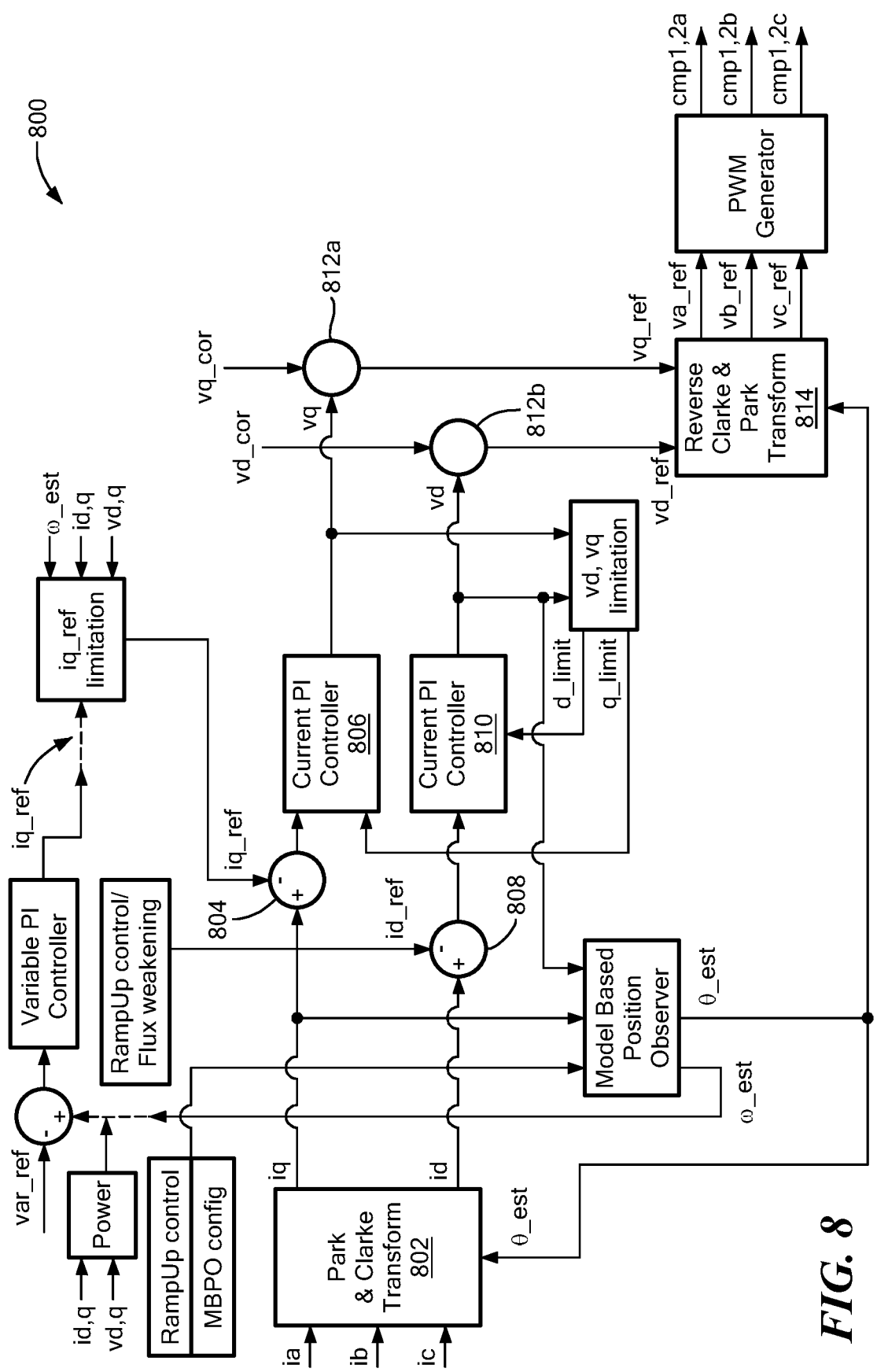
FIG. 8 show an example system for providing BEMF compensation in accordance with example embodiments of the disclosure.

Constant parameters that determine the shape of BEMF (pre-measured or measured/estimated online) can include BEMF_HCOMP_AMP, BEMF_HCOMP_N, BEMF_HCOMP_PH. BEMF_HCOMP_PH
theta_est, freq—These signals are estimated in sensorless control systems (without speed sensor) or measured signals in control systems with speed sensor.
bemf_ampl=KE*freq. where KE is a Back EMF constant.
corr_phcorr_phphase_advance—constant optional parameter for fine tuning FIG. 8 shows an example motor control system 800 using FOC with non-sinusoidal BEMF compensation in accordance with example embodiments of the disclosure. A Park and Clarke transform 802 transforms currents ia, ib, ic into id and iq vectors. The iq current is combined 804 with a quadrature reference current iq_ref and provided to a first current PI controller 806, which outputs a voltage vq component. The id current is combined 808 with a direct reference current id_ref and provided to a second PI controller 810, which outputs a voltage vd component. The voltage vectors vd, vq are input to respective summing modules module 812a,b along with EMF correction signals vd_cor, vq_cor, which are described above in detail. The summing modules 812 outputs are provided to a reverse Clarke and Park transform 814 to generate three phase signals that can be used to drive the motor phases. In embodiments, the vd voltage can be combined with a direct BEMF compensation signal vd_cor and the vq voltage can be combined with a quadrature BEMF compensation signal vq_cor. The vd and vq corrected signals can be input to the summing modules 812. It is understood that HS refers to the duration of the on state of upper transistors of the converter.

FIG. 9 shows an example sequence of steps for providing EMF compensation in accordance with example embodiments of the disclosure. In step 900, a ratio of amplitude, phase shift and order of harmonic components of the EMF, and motor BEMF constant are received. In step 902, the EMF amplitudes is determined. In step 904, amplitudes of the EMF harmonic components is determined from the EMF amplitudes and the determined ratio.

In embodiments, certain steps can be performed offline or online. For example, offline/online steps can be done once during tuning to a specific motor type or calculated online based on measured or estimated EMF parameters. In embodiments, online steps are executed every period of the control system.

In step 906, angles of the EMF harmonic components are determined from the order of the EMF harmonic components, the d-q angle, phase shifts of the EMF harmonic components. Determining the angles of the EMF harmonic components can optically include using a correction of phase shift for one or more parameters, such as delay, speed estimate error, etc.

In step 908, a first correction component that can be added to the voltage vd is determined. In step 910, a second correction component that can be added to the voltage vq is determined. The first and second correction components can be added at an output of current regulators for the vd and vq voltages for reducing non-sinusoidality of the signals to the motor.

Field-oriented control (FOC) is a known variable frequency drive technique in which stator currents of a three-phase brushless DC motor are represented as a vector having two orthogonal components corresponding to magnetic flux of the motor and motor torque. Current component references from the flux and torque references given by the speed control can be computed. Proportional-integral (PI) controllers are often used to maintain current components at reference values. PWM (pulse wave modulation) of the variable frequency drive control switching of transistors driving the motor phases according to the stator voltage references that are the output of the PI current controllers.

Vector control generates a three-phase PWM motor voltage output derived from a voltage vector to control a current vector derived from motor three-phase stator current input through rotations back and forth between the three-phase speed and time dependent system and the vector rotating reference-frame two-coordinate time invariant system, which is defined in a (d,q) coordinate system with orthogonal components along d (direct) and q (quadrature) axes such that a field flux linkage component of current is aligned along the d axis and torque component of current is aligned along the q axis. The induction motor (d, q) coordinate system can be superimposed to the instantaneous (a,b,c) three-phase sinusoidal system.

Well-known inverse and non-inverse Park and Clarke transforms can convert between a system three phase currents and voltages and a two coordinate linear time-invariant system. These transforms facilitate the use of PID controllers to maintain reference values.

Embodiments of the disclosure provide compensation of EMF non-sinusoidality influence by combining correction components in the voltage in d-q coordinate system, which provides direct compensation for influence of the non-sinusoidal BEMF by modifying the voltage shape. With this arrangement, in embodiments, accurate harmonics compensation uses only the motor speed and constant Ke. An angle between the voltage and the EMF of the motor may be accounted for by default to achieve accurate compensation of non-sinusoidal back EMF both in dynamic and static conditions, independently of the load, rotation speed and motor inductance. In some embodiments, compensation of phase shift is implemented directly to enable control of system delay, speed estimation error, and other unwanted effects.

Conventional compensation schemes use harmonic injection into reference currents. Higher harmonics are injected into slowly varying signals of reference currents in the d-q coordinate system, which the current control system must track. In these known systems there is a limitation in the range of current regulator parameters. For example, for high-quality compensation, the current regulators must be tuned for highest possible speed, which is, however, limited. In addition, there may be a decrease in the margins of control system stability.

In some conventional systems, current regulators are used in the process of compensation. As is known in the art, current regulators have a limited speed of response and inertia. In these known systems, phase displacement of the compensation components will form at the output of the current regulators relative to the real harmonics of the EMF in the motor. And this, in turn, will not allow to fully compensate for the non-sinusoidality of the EMF.

In some known systems, expressions for calculating compensation components use the motor resistance value, which is highly dependent on the motor temperature so that EMF compensation errors depends on motor temperature.

It is understood that EMF can be determined with or without sensors proximate the motor components. Example motor controller systems include U.S. Pat. Nos. 9,843,285, 10,116,243, 10,181,810, 10,312,847, 10,326,389, 10,348,223, 10,873,280, and 10,784,810, all of which are incorporated herein by reference.

FIG. 10 shows an exemplary computer 1000 that can perform at least part of the processing described herein, such as generating BEMF compensation components. The computer 1000 includes a processor 1002, a volatile memory 1004, a non-volatile memory 1006 (e.g., hard disk), an output device 1007 and a graphical user interface (GUI) 1008 (e.g., a mouse, a keyboard, a display, for example). The non-volatile memory 1006 stores computer instructions 1012, an operating system 1016 and data 1018. In one example, the computer instructions 1012 are executed by the processor 1002 out of volatile memory 1004. In one embodiment, an article 1020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
compensating for non-sinusoidal BEMF signals in an electrical motor by:
receiving ratio of amplitude, phase shift and order of BEMF harmonic components of the electrical motor;
receiving BEMF constant of the electrical motor;
determining the actual amplitude of BEMF and actual amplitudes of the BEMF harmonic components;
determining angles of the BEMF harmonic components from an order of the BEMF harmonic components, an angle from a d-q coordinate system for the motor, and phase shifts of the BEMF harmonic components relative to a fundamental first harmonic;
generating a first corrective component for vd of the d-q coordinate system for the motor from the amplitudes of the BEMF harmonic components and the angles of the BEMF harmonic components; and
generating a second corrective component for vq of the d-q coordinate system for the motor from the amplitudes of the BEMF harmonic components and the angles of the BEMF harmonic components.

2. The method according to claim 1, further including generating the first corrective component from a cosine of the angles of the BEMF harmonic components.

3. The method according to claim 2, further including generating the second corrective component from a sine of the angles of the BEMF harmonic components.

4. The method according to claim 1, wherein determining angles of the BEMF harmonic components further includes a phase shift correction factor for the BEMF harmonic components.

5. The method according to claim 4, wherein the phase shift correction factor includes compensation for delay in the system.

6. The method according to claim 4, wherein the phase shift correction factor includes compensation for speed estimation error.

7. The method according to claim 4, wherein the phase shift correction factor includes compensation for unwanted effects.

8. A system, comprising:
a compensation system having a processor and memory configured to:
compensate for non-sinusoidal BEMF signals in an electrical motor by:
receiving ratio of amplitude, phase shift and order, of BEMF harmonic components of the electrical motor;
receiving BEMF constant of the electrical motor;
determining the actual amplitude of BEMF and actual amplitudes of the BEMF harmonic components;
determining angles of the BEMF harmonic components from an order of the BEMF harmonic components, an angle from a d-q coordinate system for the motor, and phase shifts of the BEMF harmonic components relative to a fundamental first harmonic;
generating a first corrective component for vd of the d-q coordinate system for the motor from the amplitudes of the BEMF harmonic components and the angles of the BEMF harmonic components; and
generating a second corrective component for vq of the d-q coordinate system for the motor from the amplitudes of the BEMF harmonic components and the angles of the BEMF harmonic components.

9. The system according to claim 8, wherein the processor and memory are further configured for generating the first corrective component from a cosine of the angles of the BEMF harmonic components.

10. The system according to claim 8, wherein the processor and memory are further configured for generating the second corrective component from a sine of the angles of the BEMF harmonic components.

11. The system according to claim 8, wherein determining angles of the BEMF harmonic components further includes a phase shift correction factor for the BEMF harmonic components.

12. The system according to claim 11, wherein the phase shift correction factor includes compensation for delay in the system.

13. The system according to claim 11, wherein the phase shift correction factor includes compensation for speed estimation error.

14. The system according to claim 11, wherein the phase shift correction factor includes compensation for unwanted effects.

15. A system, comprising:
an interface configured to connect to an electrical motor; and
a means for compensating for non-sinusoidal BEMF signals in the electrical motor, wherein the means for compensating for non-sinusoidal BEMF signals in the electrical motor is configured for generating a first corrective component for vd of a d-q coordinate system for the motor from amplitudes of BEMF harmonic components and angles of the BEMF harmonic components, and for generating a second corrective component for vq of the d-q coordinate system for the motor from the amplitudes of the BEMF harmonic components and the angles of the BEMF harmonic components.

16. The system according to claim 15, wherein the means for compensating for non-sinusoidal BEMF on signals in the electrical motor is further configured for generating the first corrective component from a cosine of the angles of the BEMF harmonic components and generating the second corrective component from a sine of the angles of the BEMF harmonic components.

17. The system according to claim 15, wherein determining angles of the BEMF harmonic components further includes a phase shift correction factor for the BEMF harmonic components.

18. The system according to claim 17, wherein the phase shift correction factor includes compensation for delay in the system.

19. The system according to claim 17, wherein the phase shift correction factor includes compensation for speed estimation error.

* * * * *